No. 680,491. Patented Aug. 13, 1901.
C. MEHLSEN.
DEPTH INDICATOR FOR VESSELS.
(Application filed Sept. 1, 1900.)
(No Model.)
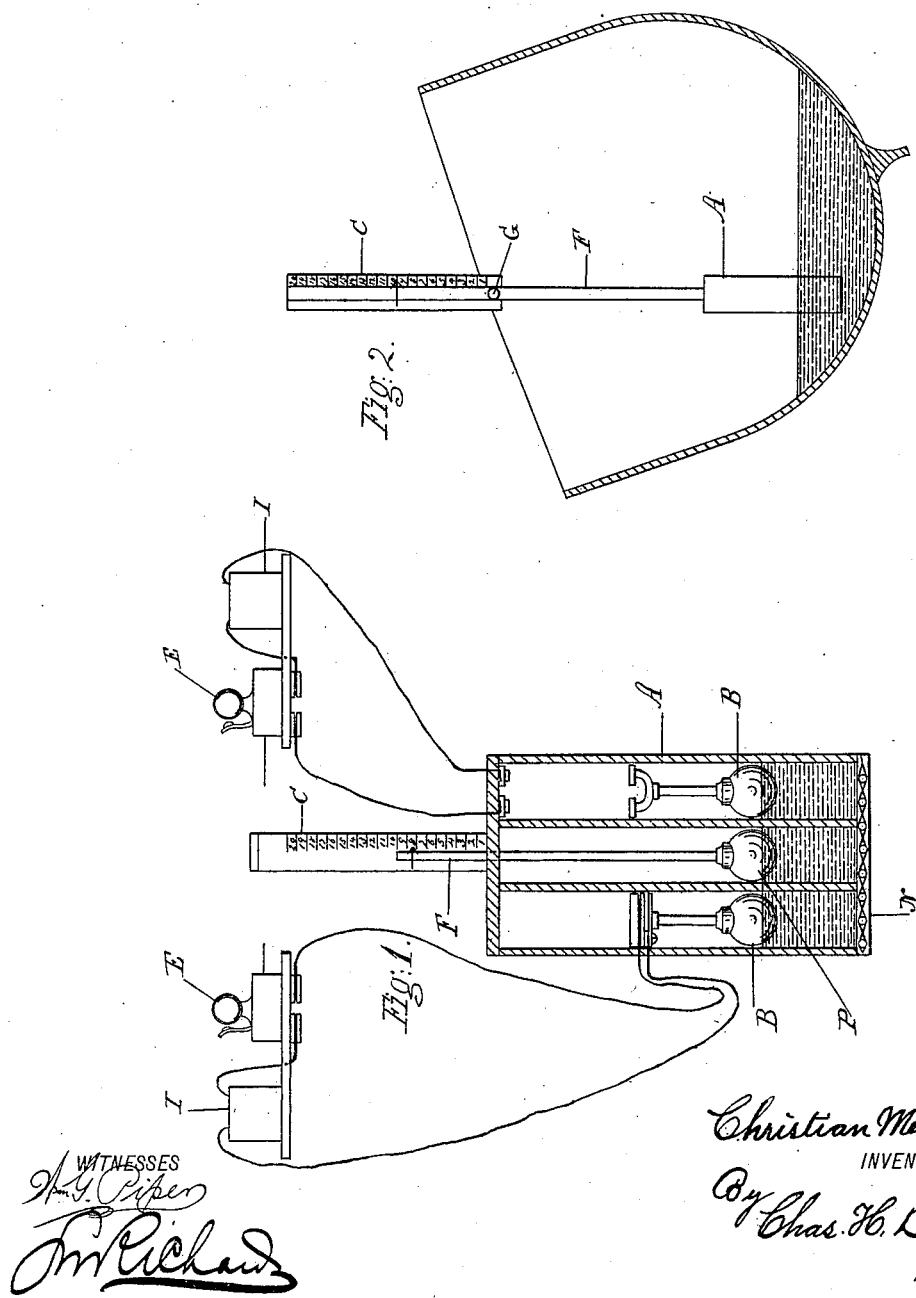
Christian Mehlsen,
INVENTOR;
By Chas. H. Davids,
ATTY.
WITNESSES

UNITED STATES PATENT OFFICE.

CHRISTIAN MEHLSEN, OF BROOKLYN, NEW YORK.

DEPTH-INDICATOR FOR VESSELS.

SPECIFICATION forming part of Letters Patent No. 680,491, dated August 13, 1901.

Application filed September 1, 1900. Serial No. 28,779. (No model.)

*To all whom it may concern:*

Be it known that I, CHRISTIAN MEHLSEN, a citizen of the United States, residing at 102 Boerum Place, Brooklyn, county of Kings, State of New York, have invented a new and useful Improvement in Mechanism to Indicate Depth of Water in the Hold of a Vessel, of which the following is a specification.

This invention relates to improvements in indicators capable of indicating the depth of water in the hold of a vessel by index and by sound, or both simultaneously or independently, and to accurately determine the varying depth of water in the hold, though the vessel may be rolling in a heavy sea, as will be described.

The objects of my invention are, first, to provide suitable mechanical means whereby the depth of water and the continued increase and decrease thereof in the hold of a vessel may be determined and indicated; second, when the water in the hold of a vessel shall have reached a certain predetermined depth notice is to be given by alarm, and, third, suitable means whereby the depth of water in the hold of a vessel and its increase or decrease therein may be determined by an indicator or by alarm when a vessel is not on an even keel or upright. These objects are attained by the mechanism illustrated in the accompanying drawings, in which—

Figure 1 represents a vertical central sectional view. Fig. 2 is a sectional view of the outlines of a vessel, showing the mechanism pivoted thereto, so as to maintain itself in a perpendicular position with reference to the roll of a vessel.

Similar letters refer to corresponding parts in both views.

In a suitable casing A, divided into compartments for the more perfect operation of the mechanism therein and into which water may flow freely through a screen or perforated bottom N, is arranged a float P, by means of which, through a stem F, with pointer extending therefrom, the depth of water and the increase or decrease thereof in the hold of a vessel may be accurately determined.

To indicate the depth of water in the hold of a vessel when it shall have reached a certain predetermined height, alarm is sounded by means of the floats B, forming electric currents between electric batteries I and electric bells E, the circuits being made by the rising of the floats B to make the contacts at the upper ends of the compartments in which they are located, as represented in Fig. 1.

To adapt this mechanism so as to operate automatically to accurately indicate the depth of water in the hold of a vessel when not on an even keel or upright, it is pivoted at G, so as to swing back and forth with the movements of the vessel and still maintain itself in a perpendicular position with reference thereto, as shown in Fig. 2.

The construction of the electric batteries I and the alarm-bells E to be operated thereby being no part of my invention, only so much of each is shown to serve in setting forth my improvements.

Having described my improvements in indicators to determine the depth of water in the holds of vessels, what I claim therein as new, and desire to secure by Letters Patent, is—

In combination, the hull of a vessel and indicator means for the depth of water in the hold, said indicator means being pivotally supported to swing laterally to indicate the depth of water when the vessel is not on an even keel, substantially as described.

In testimony whereof I, the said CHRISTIAN MEHLSEN, have signed my name to this specification, in the presence of two subscribing witnesses, this 21st day of August, 1900.

CHRISTIAN MEHLSEN.

Witnesses:
AUGUST REYMERT,
SAMUEL J. MCKENZIE.